United States Patent [19]

Hoshino et al.

[11] 4,139,083
[45] Feb. 13, 1979

[54] ADJUSTING DEVICE FOR AN INTERNAL SHOE DRUM BRAKE

[75] Inventors: Kazuo Hoshino, Sayama; Naomasa Tsunada, Tokyo, both of Japan

[73] Assignee: Nissan Motor Company, Limited, Yokohama, Japan

[21] Appl. No.: 831,286

[22] Filed: Sep. 7, 1977

[30] Foreign Application Priority Data

Sep. 9, 1976 [JP] Japan ................. 51-108315

[51] Int. Cl.² ............................................ F16D 65/56
[52] U.S. Cl. ...................... 188/79.5 GC; 188/79.5 P; 188/196 BA
[58] Field of Search ............... 188/79.5 P, 79.5 GC, 188/79.5 GE, 79.5 GT, 106 A, 106 F, 196 BA, 196 F

[56] References Cited
U.S. PATENT DOCUMENTS

| | | | |
|---|---|---|---|
| 3,583,532 | 6/1971 | Hodkinson | 188/196 BA |
| 3,621,947 | 11/1971 | Margetts | 188/79.5 P |
| 3,719,258 | 3/1973 | Margetts | 188/79.5 P |
| 4,051,928 | 10/1977 | Hayashida | 188/79.5 P |
| 4,061,211 | 12/1977 | Hoshino et al. | 188/79.5 P |

FOREIGN PATENT DOCUMENTS

| | | | |
|---|---|---|---|
| 2441630 | 3/1976 | Fed. Rep. of Germany | 188/196 BA |
| 1220992 | 1/1971 | United Kingdom | 188/79.5 P |

*Primary Examiner*—Trygve M. Blix
*Assistant Examiner*—Edward R. Kazenske

*Attorney, Agent, or Firm*—Richard L. Schwaab

[57] ABSTRACT

The invention relates to an internal shoe drum brake which comprises a back plate, two brake shoes, and shoe return springs biasing the shoes to brake release positions. An extensible strut has one end engaged by one of the brake shoes and has a rotary member with a ratchet teeth which may be rotated to extend the strut. The strut is rotatably mounted on a cross shaft to which a toggle lever is securely mounted for rotation therewith. The toggle lever extends through the back plate and has an operating arm, which is operatively connected to a parking brake lever mounted within a passenger compartment, disposed on an outside of the back plate and an actuating arm disposed on the inside of the back plate and engaged by the other brake shoe. An adjust lever which has a pawl engageable with the teeth of the rotary member is rotatably mounted on the cross shaft and biased in a rotational direction to cause the pawl to rotate the rotary member in a direction to extend the strut by means of a tension spring extending between the adjust lever and the strut. Stopper pin means is provided for transmitting the rotational movement of the adjust lever due to bias of the tension spring to the toggle lever to press the operating arm into engagement with the outside of the back plate thereby to press the cross shaft into engagement with the inside of the back plate whereby the strut is held in proper position even when the axial load applied to the strut is relieved of.

2 Claims, 5 Drawing Figures

ADJUSTING DEVICE FOR AN INTERNAL SHOE DRUM BRAKE

BACKGROUND OF THE INVENTION

The present invention relates to internal shoe drum brakes for motor vehicles having a manually actuated parking brake means, and more particularly to an improvement in and relative to a wear compensating adjuster which automatically adjusts a clearance between a brake drum and each brake shoe, that is; a so-called shoe clearance, to compensate for wear of linings upon release stroke of a manually actuated parking brake means.

In internal shoe drum brakes, a manually actuated brake means comprises an extensible strut having one end engaged by one of two brake shoes, a cross shaft on which the strut is rotatably mounted, and a toggle lever securely mounted on the cross shaft for rotation therewith and having an actuating arm engaged by the other one of the brake shoes and an operating arm operatively connected to a parking brake lever mounted within a passenger compartment. When the parking brake lever is actuated to apply brakes, the toggle lever will be rotated to cause the actuating arm to press the corresponding brake shoe toward a brake drum and the reaction force is transmitted to the other brake shoe through the cross shaft and the strut to press it toward the drum, thus expanding the brake shoes toward the brake drum. A wear compensating adjuster in these brakes comprises an adjust lever with a pawl engageable with ratchet teeth on a rotary member which may be rotated to extend the strut. The adjust lever is rotatably mounted on the cross shaft with as adjust spring and a stopper pin at a predetermined angular position relative to the cross shaft. If wear compensation is required, the pawl of the adjust lever will ride over at least one ratchet tooth on the rotary member of the strut upon rotational movement of the toggle lever during actuation of the parking brake lever to apply brakes and subsequently the rotary member will be rotated to extend the strut in response to return rotational movement of the adjust lever following the return rotational movement of the toggle lever upon release stroke of the parking brake lever.

Japanese patent application laid open to public inspection for opposition purpose under No. 50-5346 (corresponding to U.S. Pat. No. 3,621,947, patented Nov. 23, 1971) disloses a wear compensating adjuster in an internal shoe drum brake in which an adjust lever with a pawl which is rotatably mounted on a cross shaft has a slot to receive one end of a torsion spring which surrounds the cross shaft and has its other end anchored to a dowel pin projecting from the cross shaft and the torsion spring has a projecting end engaging with a shoulder of the toggle lever. In this spring arrangement, since the torsion spring acts between the adjust lever and the toggle lever only to produce internal forces within the assembly of the adjust lever, the cross shaft and the toggle lever, no force will be produced to press an actuating arm of the toggle lever projecting outwardly through a back plate against the outside of the back plate to press the cross shaft against the inside of the back plate. The strut, therefore, is held in its proper position mainly by an axial load applied thereto by the shoe return springs. This causes a problem that upon brake application of a parking brake lever during brake application of a service brake, when the axial load is relieved of, the pawl rolls the strut through a ratchet rotary member as the adjust lever pivots about the cross shaft, making accurate wear compensating adjustment impossible.

Another problem is that the strut rattles to abut the back plate to make a noise during operation of the vehicle on a rough road surface having bumps with the service brake applied because the axial load on the strut is relieved of under this operating condition.

To solve the problems as above, it is possible to provide means for pressing the cross shaft against the back plate. This, however, causes a cost increase because additional components must be added. Another shortcoming is that since a space sufficiently large enough to accommodate such additional components is not available adjacent a cross shaft, it is quite difficult to install these additional compoments.

The spring arrangement as described above requires a bulky torsion spring to apply a force great enough to a pawl to rotate a ratchet rotary member.

The spring arrangement as described above will require a torsion spring bulky enough to apply sufficient torque and compression to an adjust lever for designed operation of strut extending means including a pawl and a cooperating ratchet rotary member and thus the size of an adjust lever, a cross shaft and a toggle lever must be large and strong enough to withstand stress caused by the bulky torsion spring. Therefore, with this spring arrangement, it is quite difficult to make an internal shoe drum brake compact.

SUMMARY OF THE INVENTION

It is therefore an object of the present invention to provide an internal shoe drum brake in which with less components the problems as described above are eliminated.

It is another object of the present invention to provide a compact internal shoe drum brake which is free of the aforementioned problems.

It is still another object of the present invention to provide an internal shoe drum brake in which a tension spring acts between a strut and an adjust lever to provide an arrangement whereby an actuating arm of a toggle lever is pressed against the outside of a back plate to press a cross shaft against the inside of the back plate to securely hold the strut on the back plate.

BRIEF DESCRIPTION OF THE DRAWINGS

The preferred embodiments of an internal shoe drum brake according to the present invention will now be described by way of example, with reference to the accompanying drawings, in which:

Describing in detail a preferred embodiment of an internal shoe drum brake according to the present invention, FIG. 1 is a side elevation of the brake and FIG. 2 a section on the line II—II of FIG. 1.

In FIGS. 1 and 2, reference 1 designates a leading brake shoe having thereon a brake lining 1a, whereas reference numeral 2 a trailing brake shoe having thereon a brake lining 2a. These brake shoes 1 and 2 are biased towards each other by shoe return springs 3 and 4. Reference numerals 5 designate fixing springs for the brake shoes 1 and 2, respectively, and reference numeral 6 a wheel cylinder, a hydraulic actuator, carried by a back plate 7. For service brake operation, the actuator 6 expands the shoes 1 and 2 against the action of the shoe return springs 3 and 4 towards a brake drum (not shown) in a well known manner.

A strut unit, generally designated by 8, limit or defines distance between the brake shoes 1 and 2 when the service brake is released, and constitutes part of a parking brake and an automatic shoe slack adjuster.

Figure 2:
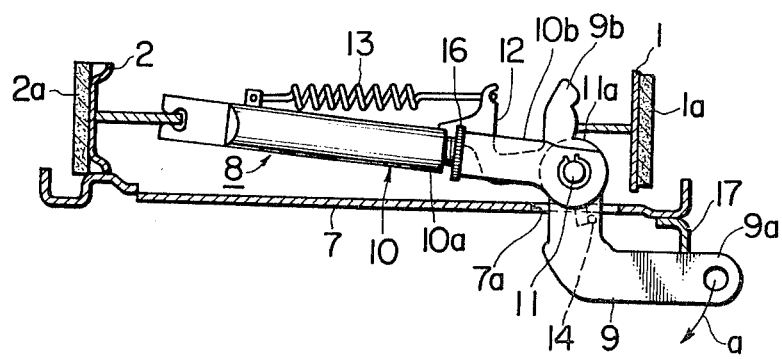
FIG. 2 is a section on the line II—II of FIG. 1.

The strut unit 8 comprises a toggle lever 9, which is rotated clockwise (viewing in FIG. 2, along an arrow a) by a parking brake lever (not shown) mounted within a passenger compartment, and a strut, generally designated by 10. The strut 10 has one end rotatably mounted on a cross shaft 11 secured to the toggle lever 9 and an opposite end engaging a hub portion of the shoe 2. The toggle lever 9 has an operating arm 9a extending through an eye 7a formed in the back plate outwardly of the drum brake and an actuating arm or a finger 9b, which is remote from the operating arm 9a, engaging a hub portion of the other shoe 1 in a well known manner.

Figure 1:
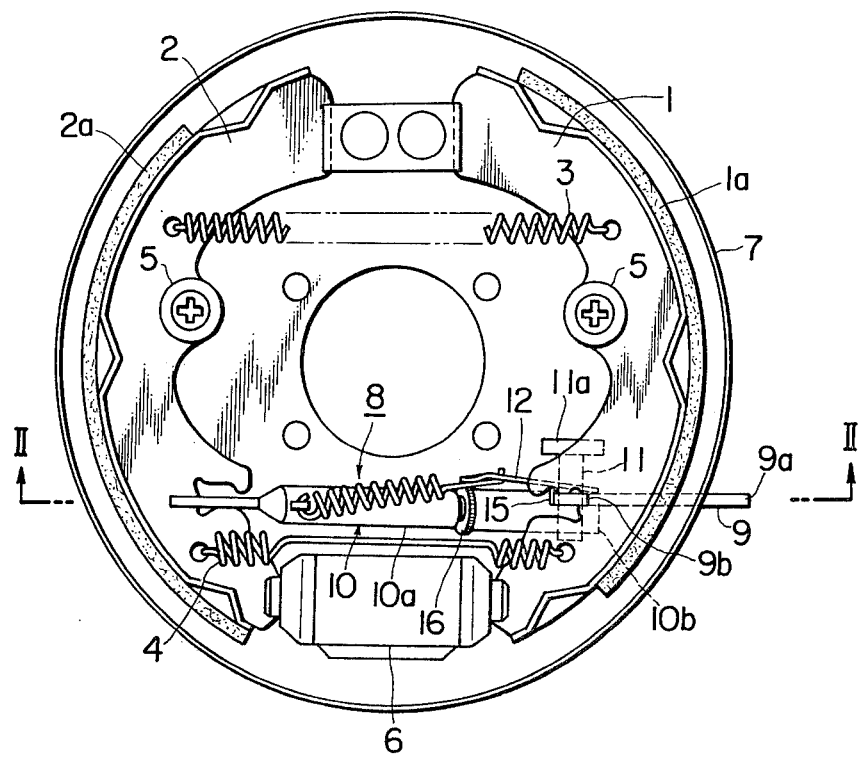
FIG. 1 is a side elevation of the brake.

Rotatably mounted on the cross shaft 11 is an adjust lever 12 and an adjust spring 13, in the form of a tension spring, has one end anchored to this adjust lever 12 and an opposite end anchored to the strut 10 and extends therebetween in tension. The adjust spring 13 biases the adjust lever 12 counterclockwise (viewing in FIG. 2) and this rotational direction of the adjust lever 12 due to the adjust spring 13 is limited by a stopper pin 14 embedded into the toggle lever 9, whereas clockwise rotational direction of the toggle lever 9 due to the force of the spring 13 via the adjust lever 12 and the stopper pin 14 is limited by a shoulder 15 (see FIG. 1) formed at the strut 10 engaging the actuating arm 9b. It will be noted that the toggle lever 9, strut 10, cross shaft 11, adjust lever 12 and adjust spring 13 would form a single unit even upon removal from the back plate 7.

Figure 3:
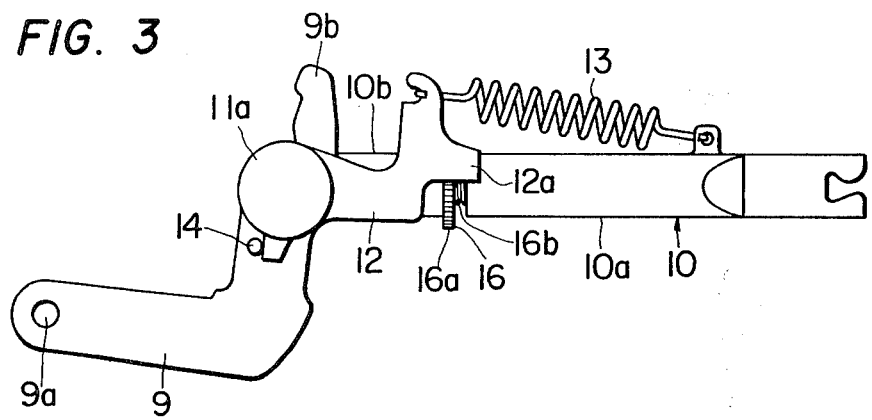
FIG. 3 is a section on the line II—II of FIG. 1 as viewed from the other side with the brake shoes and the back plate removed.
Figure 4:
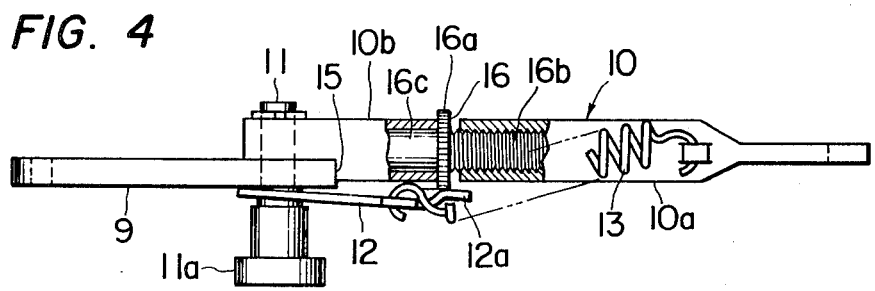
FIG. 4 is an elevation, partly broken away of FIG. 3.

FIGS. 3 and 4 illustrate the detail of the strut 10. The strut 10 comprises two axially split portions 10a and 10b and a rotary member 16 disposed between the two portions 10a and 10b. The rotary member 16 has a wheel section 16a formed with ratchet teeth on its periphery, a plunger section 16c extending from one end of the wheel section and slidably mounted within the portion 10b, and a screw threaded section 16b extending from an opposite end of the wheel section and screw threaded into the portion 10a. The portion 10b is rotatably supported on the cross shaft 11, whereas the portion 10b is bifurcated at one end to engage hub of the shoe 2 (see FIG. 2). With this arrangement, the wheel section 16a is biased against an annular end of the portion 10b by means of shoe return springs 3 and 4, and rotation of the rotary member 16 relative to the portions 10a and 10b will cause extension or retraction of the strut 10 resulting in an adjustment of distance between the brake shoes 1 and 2, that is, an adjustment of a shoe clearance.

The adjust lever 12 has a pawl section 12a cooperating with the ratchet teeth of the wheel section 16a of the strut 10, and the pawl section 12a is biased against the ratchet wheel section 16a by means of the adjust spring 13. To obtain this force to bias the pawl section 12a against the ratchet teeth of the wheel section 16a, the adjust spring 13 extends as inclined with respect to the strut 10 (viewing in FIGS. 1 and 4).

In assembling the strut unit 8 constructed as above into its operative position, the toggle lever 9 should be extended outwardly of the back plate 7 through the aperture 7a and then the actuating arm 9b is engaged with the hub of the shoe 1, while the portion 10b is engaged with the hub of the other shoe 2 by inserting this hub into the bifurcated end of the portion 10b. In this instance, the enlarged flange 11a of the cross shaft 11 should be arranged so as to abut with the back plate 7, while the operating arm 9a should be arranged so as to abut with a stopper 17 secured to the outside of the back plate 7. By appropriately positioning the operating arm 9a of the toggle lever 9 with respect to the stopper 17 by suitably determining the size of the enlarged flange 11a, the back plate 7 can be interposed between the operating arm 9a of the toggle lever 9 and the enlarged flange end 11a of the cross shaft 11 under the bias action of the adjust spring 13. It will now be understood how to assemble the strut unit 8 with the back plate 7 to form a final assembly.

An internal shoe drum brake constructed as above will operate as follows:

When the toggle lever 9 is rotated in a direction designated by an arrow a (viewing in FIG. 2) upon actuation of a parking brake lever for application of a parking brake, the actuating arm or finger 9b of the toggle lever 9 will force the brake shoe 1 against the action of the return springs 3 and 4 towards the brake drum 7. The reaction force is transmitted to the other brake shoe 2 via the cross shaft 11 and the strut 10 to press this brake shoe 2 towards the brake drum 7. As a result, parking brake is applied. During actuation of the parking brake lever for application of the parking brake, the adjust lever 12 is rotated by the toggle lever 9 through engagement of the stopper pin 14 with the adjust lever 12, the pawl 12a of the adjust lever 12 would ride over at least one of the ratchet teeth of the wheel section 16a to engage another one of the ratchet teeth if wear of the brake linings 1a and 2a is excessive. Therefore return rotation of the toggle lever 9 upon the subsequent release stroke of the parking brake lever will permit the adjust spring 13 to rotate the adjust lever 12 in a direction to follow the return rotation of the toggle lever 9 causing the pawl 12a of the adjust lever 12 to rotate the rotary member 16 in a direction to extend the length of the strut 10. This rotation of the rotary member 16 will space the strut portions 10a and 10b apart from each other by an amount corresponding to the rotation of the threaded rod section 16b to extend the strut 10 so as to adjust a shoe space between each brake shoe 1 or 2 and the drum 7 to compensate wear of the brake shoe linings 1a and 2a.

Since the adjust spring 13 acts between the strut portion 10a and the adjust lever 12 to bias the wheel section 16a of the rotary member into firm engagement with the annular end of the strut portion 10b as the strut 10 increases its length, resistance to rotation of the rotary member 12 will increase. This resistance, if significant, could be eliminated by providing an arm (not shown) extending from the strut portion 10b towards the strut portion 10a with its free end positioned over the strut portion 10a and by arranging the adjust spring 13 to extend between this free end of the arm and the adjust lever 12. With this arrangement of the adjust spring 13, the magnitude of a force biasing the pawl 12a against the ratchet teeth on the wheel section 16a can be made constant.

It will now be understood that according to the invention the adjust spring takes the form of a tension spring extending between the strut 10 and the adjust lever in a manner to bias the pawl 12a against the ratchet teeth on the rotary member 16. This arrangement of the adjust spring 13 will enable the designer of a internal shoe drum brake to select any spring having such a spring force as required to bias the pawl 12a against the ratchet teeth on the wheel section 16a to secure operation of the adjust lever 12 without regard to the size of the spring because there is enough room over the strut 10 for accommodation of the adjust spring 13. This arrangement also permits the adjust spring 13 to impart a thrust and a bending force between the threaded rod section 16b and the threaded bore of the strut portion 10a, increasing resistance to rotation of the rotary member 16 by the adjust lever 12 during rotation of the adjust lever 12 when the parking brake is actuated for application of the parking brake. As best seen from FIG. 2, due to the action of the adjust spring 13, the back plate 7 is interposed between the enlarged end flange 11a of the cross shaft 11 and the operation portion 9a of the toggle lever 9 engaging the stopper 17 secured to the outside of the back plate 7.

Even when the axial load due to the return springs 3 and 4 reduces upon operation of the service brake, rattling of the components of the strut 8 which would otherwise occur will be prevented because the adjust spring 13 presses the operating arm 9a against the outside of the back plate 7 to press the cross shaft 11 against the inside of the back plate 7 to secure the strut 8 to the back plate 7. Rolling of the strut 8 which would otherwise occur during operation of the service brake will be prevented for the same reason.

Additionally saying, according to the present invention without any additional components to an internal shoe drum brake of prior art construction of the same type, problems inherent to such drum brake are eliminated. This causes great merits in practical base, manufacturing base and design base.

Figure 5:
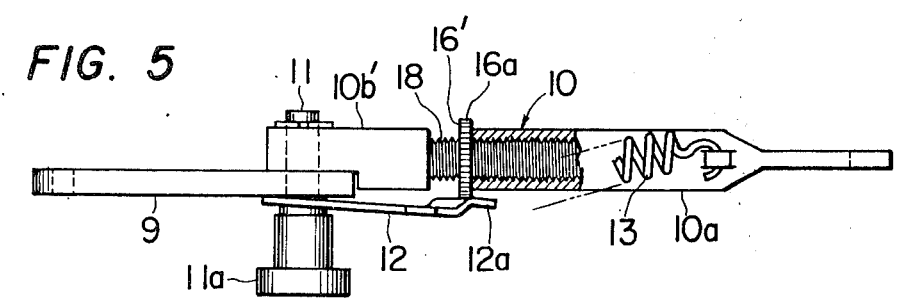
FIG. 5 is a similar view to FIG. 4 showing another embodiment.

Referring to FIG. 5, another embodiment of a strut construction is shown which differs from the preceding embodiment in that one strut portion 106' has an integral threaded rod section 18 threadedly screwed into another strut portion 10a and a rotary member 16' in the form of a nut 16a with ratchet teeth on its outer periphery threadedly engages the threaded rod section 18 and an annular end of the strut portion 10a under the bias of an adjust spring 13. The operation of the strut unit shown in FIG. 5 and its effect are the same as those of the strut unit shown in FIGS. 1 to 4.

What is claimed is:

1. An internal shoe drum brake assembly comprising:
   a back plate;
   two brake shoes;
   shoe return springs biasing said shoes to brake release positions;
   an extensible strut having one end engaged by one of said two brake shoes;
   a cross shaft on which said strut is rotatably mounted;
   a toggle lever forming part of a manually actuated parking brake means, said toggle lever being mounted on said cross shaft for rotation therewith extending through said back plate, said toggle lever having an operating arm disposed on one side of said back plate and an actuating arm disposed on the opposite side of said back plate and engaged by the other one of said two brake shoes;
   said strut having a rotary member with ratchet teeth on its periphery which may be rotated to extend said strut;
   an adjust lever with a pawl engageable with said ratchet teeth, said adjust lever being rotatably mounted on said cross shaft;
   an adjust spring in the form of a tension spring extending between said strut and said adjust lever to bias said adjust lever in a direction to cause the pawl to rotate said rotary member in a direction to extend said strut; and
   stopper means for transmitting the rotational movement of said adjust lever due to the bias of said adjust spring to said toggle lever to press said operating arm into engagement with a portion of said one side of said back plate thereby to press a portion of said cross shaft into engagement with said opposite side of said back plate in such a manner that the back plate is interposed between said operating arm and said cross shaft.

2. An internal shoe drum brake assembly as claimed in claim 1, in which said tension spring extends as inclined with respect to said strut to bias said pawl into operative engagement with said rotary member of said strut.

* * * * *